(12) United States Patent
Dai et al.

(10) Patent No.: US 8,035,552 B2
(45) Date of Patent: Oct. 11, 2011

(54) DISTANCE DEPENDANT ERROR MITIGATION IN REAL-TIME KINEMATIC (RTK) POSITIONING

(75) Inventors: Liwen L. Dai, Chino Hills, CA (US); Daniel J. Eslinger, Huntington Beach, CA (US); Richard T. Sharpe, Torrence, CA (US); Ronald R. Hatch, Willington, CA (US)

(73) Assignee: Navcom Technology, Inc., Torrance, CA (US)

( * ) Notice: Subject to any disclaimer, the term of this patent is extended or adjusted under 35 U.S.C. 154(b) by 564 days.

(21) Appl. No.: 12/119,451

(22) Filed: May 12, 2008

(65) Prior Publication Data

US 2009/0135056 A1 May 28, 2009

Related U.S. Application Data

(60) Provisional application No. 60/941,273, filed on May 31, 2007.

(51) Int. Cl.
*G01S 19/40* (2010.01)
(52) U.S. Cl. .................................................. 342/357.23
(58) Field of Classification Search ............. 342/357.23, 342/357.26, 357.27
See application file for complete search history.

(56) References Cited

U.S. PATENT DOCUMENTS

| | | | | |
|---|---|---|---|---|
| 5,991,691 A | * | 11/1999 | Johnson | 701/214 |
| 6,127,968 A | * | 10/2000 | Lu | 342/357.31 |
| 6,753,810 B1 | | 6/2004 | Yang et al. | 342/257.14 |
| 7,312,747 B2 | | 12/2007 | Vollath et al. | 342/357.62 |
| 2005/0001762 A1 | | 1/2005 | Han et al. | 342/357.04 |
| 2009/0262013 A1 | * | 10/2009 | Vollath | 342/357.04 |

FOREIGN PATENT DOCUMENTS

| | | |
|---|---|---|
| EP | 1498745 | 1/2005 |
| EP | 1498745 A3 * | 4/2006 |

OTHER PUBLICATIONS

Lawrence, David et al, "Decorrelation of Troposphere Across Short Baselines," IEEE Plans 2006, pp. 94-102.*
Chang, X.-W. et al., "MLAMBDA: A Modified LAMBDA Method for Integer Least-Squares Estimation," Journal of Geodesy, vol. 79, No. 9, Dec. 2005, pp. 552-565.
De Jonge, P. et al., "The LAMBDA Method for Integer Ambiguity Estimation: Implementation Aspects," Publications of the Delft Geodetic Computing Centre, No. 12, Aug. 1996, pp. 1-49.

(Continued)

*Primary Examiner* — Gregory C Issing
(74) *Attorney, Agent, or Firm* — Morgan, Lewis & Bockius LLP

(57) ABSTRACT

A method for mitigating atmospheric errors in code and carrier phase measurements based on signals received from a plurality of satellites in a global navigation satellite system is disclosed. A residual tropospheric delay and a plurality of residual ionospheric delays are modeled as states in a Kalman filter. The state update functions of the Kalman filter include at least one baseline distance dependant factor, wherein the baseline distance is the distance between a reference receiver and a mobile receiver. A plurality of ambiguity values are modeled as states in the Kalman filter. The state update function of the Kalman filter for the ambiguity states includes a dynamic noise factor. An estimated position of mobile receiver is updated in accordance with the residual tropospheric delay, the plurality of residual ionospheric delays and/or the plurality of ambiguity values.

39 Claims, 5 Drawing Sheets

OTHER PUBLICATIONS

Sivaraman, M.R. et al., "Applications of Kalman Filter in WAAS," http://www.gisdevelopment.net/technology/gps/techgp0033pf.htm, May 12, 2002, pp. 1-6.

Dai, Liwen et al. Innovative Algorithms to Improve Long Range RTK Reliability and Availability. Proceedings of the 2007 National Technical Meeting of the Institute of Navigation, US. Jan. 24, 2007. pp. 860-872.

De Jonge, *The Distributional Dependence of the Range on Triple Frequency GPS Ambiguity Resolution*, ION NTM 2000, Jan. 26-29, 2000, Anaheim, CA, pp. 605-612.

International Search Report and Written Opinion, PCT/US2008/006608, Oct. 9, 2008, 9 pgs.

International Search Report and Written Opinion, PCT/US2008/006609, Oct. 9, 2008, 8 pgs.

Mowlam, *Baseline Precision Results Using Triple Frequency Partial Ambiguity Sets*, Proceedings of the 17th International Technical Meeting of the Satellite Division of the Institute of Navigation GNSS, Sep. 21-24, 2004, Long Beach, CA, pp. 2509-2518.

Office Action, U.S. Appl. No. 12/119,450, Sep. 28, 2010, 6pgs.

Park, *Efficient Ambiguity Resolution Using Constraint Equation*, IEEE Plans, 1996, pp. 277-284.

Teunissen, *Geometry-free Ambiguity Success Rates in Case of Partial Fixing*, Proceedings of the 1999 National Technical Meeting of the Institute of Navigation, Jan. 25, 1999, pp. 201-207.

Yang, *A Fast Ambiguity Resolution Technique for RTK Embedded Within a GPS Receiver*, NavCom Technology White Paper, Oct. 2006, 7 pgs.

Yang, *Minimizing the Integer Ambiguity Search Space for RTK*, NavCom Technology White Paper, Apr. 2005, 6 pgs.

* cited by examiner

DISTANCE DEPENDANT ERROR MITIGATION IN REAL-TIME KINEMATIC (RTK) POSITIONING

RELATED APPLICATIONS

This application claims priority to U.S. Provisional Application No. 60/941,273, filed May 31, 2007, "Distance Dependent Error Mitigation in Real-Time Kinematic (RTK) Positioning," which is incorporated by reference herein in its entirety.

This application is related to U.S. patent application Ser. No. 12/119,450, filed May 12, 2008, "Partial Search Carrier-Phase Integer Ambiguity Resolution," which application is incorporated by reference herein in its entirety.

TECHNICAL FIELD

The disclosed embodiments relate generally to technologies associated with positioning systems, such as the Global Positioning System (GPS) or the European Galileo System, and more particularly to methods of mitigating atmospheric errors in code and carrier phase measurements.

BACKGROUND

A wide-area positioning system, such as the Global Positioning System (GPS), uses a constellation of satellites to position or navigate objects on earth. Each satellite in the GPS system currently transmits two carrier signals, L1 and L2, with frequencies of 1.5754 GHz and 1.2276 GHz, and wavelengths of 0.1903 m and 0.2442 m, respectively. Next generation Global Navigation Satellite Systems (GNSS), such as the modernized GPS and Galileo systems, will offer a third carrier signal: L5. In the GPS system, L5 will have a frequency of 1.1765 GHz, and a wavelength of 0.2548 m.

Two types of GPS measurements are usually made by a GPS receiver: pseudorange measurements and carrier phase measurements.

The pseudorange measurement (or code measurement) is a basic GPS observable that all types of GPS receivers can make. It utilizes the C/A or P codes modulated onto the carrier signals. With the GPS measurements available, the range or distance between a GPS receiver and each of a plurality of satellites is calculated by multiplying a signal's travel time (from the satellite to the receiver) by the speed of light. These ranges are usually referred to as pseudoranges because the GPS measurements may include errors due to various error factors, such as satellite clock timing error, ephemeris error, ionospheric and tropospheric refraction effects, receiver tracking noise and multipath error, etc. To eliminate or reduce these errors, differential operations are used in many GPS applications. Differential GPS (DGPS) operations typically involve a base reference GPS receiver, a user GPS receiver, and a communication mechanism between the user and reference receivers. The reference receiver is placed at a known location and is used to generate corrections associated with some or all of the above error factors. Corrections generated at the reference station, or raw data measured at the reference station, or corrections generated by a third party (e.g., a computer or server) based on information received from the reference station (and possibly other reference stations as well) are supplied to the user receiver, which then uses the corrections or raw data to appropriately correct its computed position.

The carrier phase measurement is obtained by integrating a reconstructed carrier of the signal as it arrives at the receiver. Because of an unknown number of whole cycles in transit between the satellite and the receiver when the receiver starts tracking the carrier phase of the signal, there is a whole-cycle ambiguity in the carrier phase measurement. This whole-cycle ambiguity must be resolved in order to achieve high accuracy in the carrier phase measurement. Whole-cycle ambiguities are also known as "integer ambiguities," after they have been resolved, and as "floating ambiguities" prior to their resolution. Differential operations using carrier phase measurements are often referred to as real-time kinematic (RTK) positioning/navigation operations.

High precision GPS RTK positioning has been widely used for many surveying and navigation applications on land, at sea and in the air. The distance from the user receiver to the nearest reference receiver may range from a few kilometers to hundreds of kilometers. As the receiver separation (i.e., the distance between a reference receiver and a mobile receiver whose position is being determined) increases, the problem of accounting for distance-dependent biases grows and, as a consequence, reliable ambiguity resolution becomes an even greater challenge. The major challenge is that the residual biases or errors after double-differencing can only be neglected for ambiguity resolution purposes when the distance between the two receivers is less than about 10 km. For longer distances the distance-dependent errors, such as orbital error and ionospheric and tropospheric delays, become significant problems. Determining how long the observation span should be to obtain reliable ambiguity resolution is a challenge for GPS RTK positioning. The longer the observation span that is required, the longer the "dead" time during which precise positioning is not possible. The ambiguity resolution process is required at the start of GPS navigation and/or surveying and whenever to many of the GPS signals are blocked or attenuated such that cycle slips or measurement interruptions occur. Quality control of the GPS RTK positioning is critical and is necessary during all processes: data collection, data processing and data transmission. Quality control procedures are applied to both the carrier phase-based GPS RTK positioning and to the pseudo-range-based DGPS. The quality control and validation criterion for ambiguity resolution represents a significant challenge to precise GPS RTK positioning.

SUMMARY OF EMBODIMENTS

A method for mitigating distance dependant atmospheric errors in code and carrier phase measurements includes estimating a residual tropospheric delay, a plurality of residual ionospheric delays and an ambiguity value. An estimated position of a mobile receiver is then updated in accordance with these estimates.

In one embodiment, a residual tropospheric delay is modeled as a state in a Kalman filter. In one embodiment, a plurality of residual ionospheric delays are modeled as states in a Kalman filter. The state update functions of the Kalman filter include at least one baseline distance dependent factor. The baseline distance dependent factor corresponds to a distance between a reference receiver and a mobile receiver.

In one embodiment a plurality of ambiguity values are stored in a plurality of states in the Kalman filter. These states are then updated in accordance with a state update function that includes at least one dynamic noise factor.

The estimation of the atmospheric error sources limits the distance dependent errors of the GPS RTK systems and allows for longer-range applications with precise position estimates.

BRIEF DESCRIPTION OF THE DRAWINGS

Like reference numerals refer to corresponding parts throughout the drawings.

DESCRIPTION OF EMBODIMENTS

Figure 1:
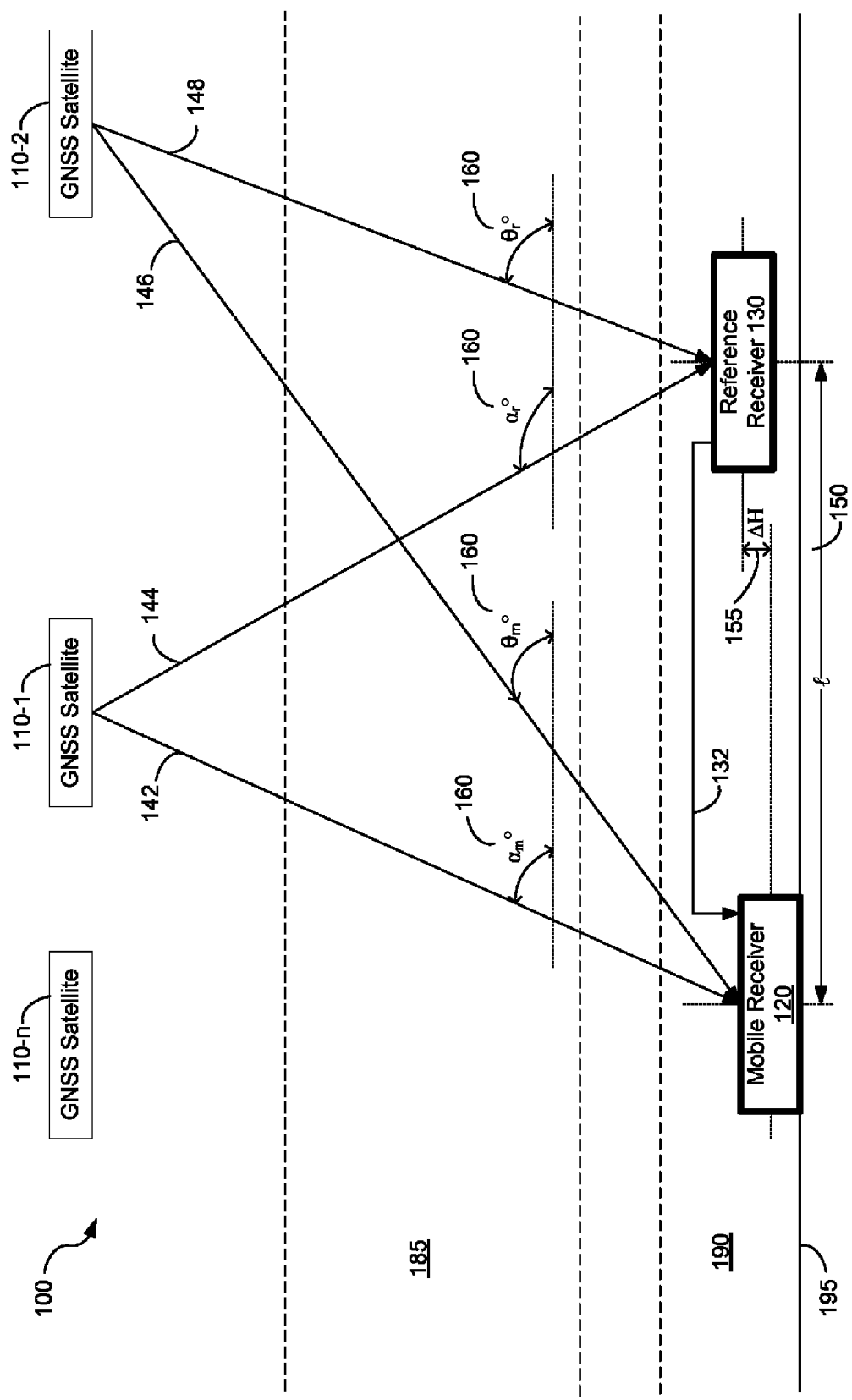
FIG. 1 illustrates a global navigation satellite system.

FIG. 1 illustrates a global navigation satellite system 100, according to one embodiment of the present invention. The global navigation satellite system (GNSS) includes a plurality of satellites 110-1, 110-2, . . . , 110-$n$, where n is the number of satellites in view of a mobile receiver 120 and a reference receiver 130, which is typically located at a known, previously established position. The plurality of satellites 110-$n$, or any one or more of them, are sometimes referred to hereafter in this document as satellites(s) 110.

The mobile receiver 120 takes code and carrier phase measurements of the GPS signals 142 and 146 received from the satellites 110. The reference receiver 130 takes code and carrier phase measurements of the GPS signals 144 and 148 received from the satellites 110 and generates corrections 132 to those measurements, based at least in part on the previously established location of the reference receiver. The corrections 132 are then communicated to the mobile receiver 120. While the description in this document frequently uses the terms "GPS" and "GPS signals" and the like, the present invention is equally applicable to other GNSS systems and the signals from the GNSS satellites in those systems.

The baseline distance 150 and the height difference 155 between the mobile receiver 120 and the reference receiver 130 are equal to l and $\Delta H$ meters, respectively. The baseline distance 150 represents the horizontal component of the distance between the mobile receiver 120 and the reference receiver 130. With respect to the mobile receiver 120, the satellite elevation 160 for GPS signals 142 and 146 is $\alpha_m°$ and $\theta_m°$, respectively. With respect to the reference receiver 130, the satellite elevation 160 for GPS signals 144 and 148 is $\alpha_r°$ and $\theta_r°$, respectively.

GPS signals 142, 144, 146, 148 are transmitted by the satellites 110 through the ionosphere 185 and the troposphere 190 of earth.

The troposphere 190 extends from earth's surface 195 up to about 16 km in height and is composed of dry gases and water vapor. The GPS signals 142, 144, 146, 148 are refracted by the troposphere 190. The magnitude of the tropospheric delay is dependent upon the satellite elevation angle 160 (from the receiver to the satellite). The tropospheric delay is equal to about 2.3 m in the zenith direction (an elevation angle of 90 degrees) and increases to over 25 m for an elevation angle 160 of five degrees. The dry component can be modeled with high accuracy, but the smaller wet component is much more difficult to model. The differential tropospheric delay of mainly the wet component varies typically from about 0.2 to 0.4 parts per million (ppm) of the baseline distance 150. The spatial and temporal characteristics of the residual tropospheric delay can be characterized by probabilistic laws or statistical models. The effects of the troposphere on radio wave propagation then can be predicted over varying spatial dimensions and temporal scales according to a given probability density function or stochastically in terms of the spatial and temporal correlations of the fluctuations. In one embodiment, the residual tropospheric delay can be considered a first-order Gauss-Markov process.

The ionosphere 185 starts at about 50 km above earth's surface 195 and extends to heights of 1000 km or more. Solar radiation in the ionosphere 185 causes atoms to ionize such that free electrons exist in sufficient quantities to significantly affect the propagation of radio waves. The ionosphere 185 advances the carrier phase, which causes the carrier phase measurements to be decreased, but, delays the code modulation, which causes the code measurements to be increased. The magnitude of the ionospheric delay is dependent upon the frequency of the signal and upon solar radiation effects. Therefore, the ionospheric delay is different for daytime and nighttime and from one season to another. Diurnally, the ionospheric delay usually reaches a first peak at approximately 14:00 local time, a second peak at approximately 22:00 local time, and drops to a minimum just before sunrise. Under extreme conditions, the ionospheric delay can reach 15 m in the zenith direction and more than 200 m at elevations near the horizon. The ionosphere is typically the largest error source for differential processing and varies from one part per million (ppm) of the baseline distance 150 during low ionospheric periods at mid latitudes to greater than 10 ppm at low geomagnetic latitudes during midday. The GPS satellites broadcast in real time correction data (e.g., coefficients of the Klobuchar model) that enables single-frequency receivers to remove, on average, about fifty percent of the ionospheric refraction effects.

Figure 2:
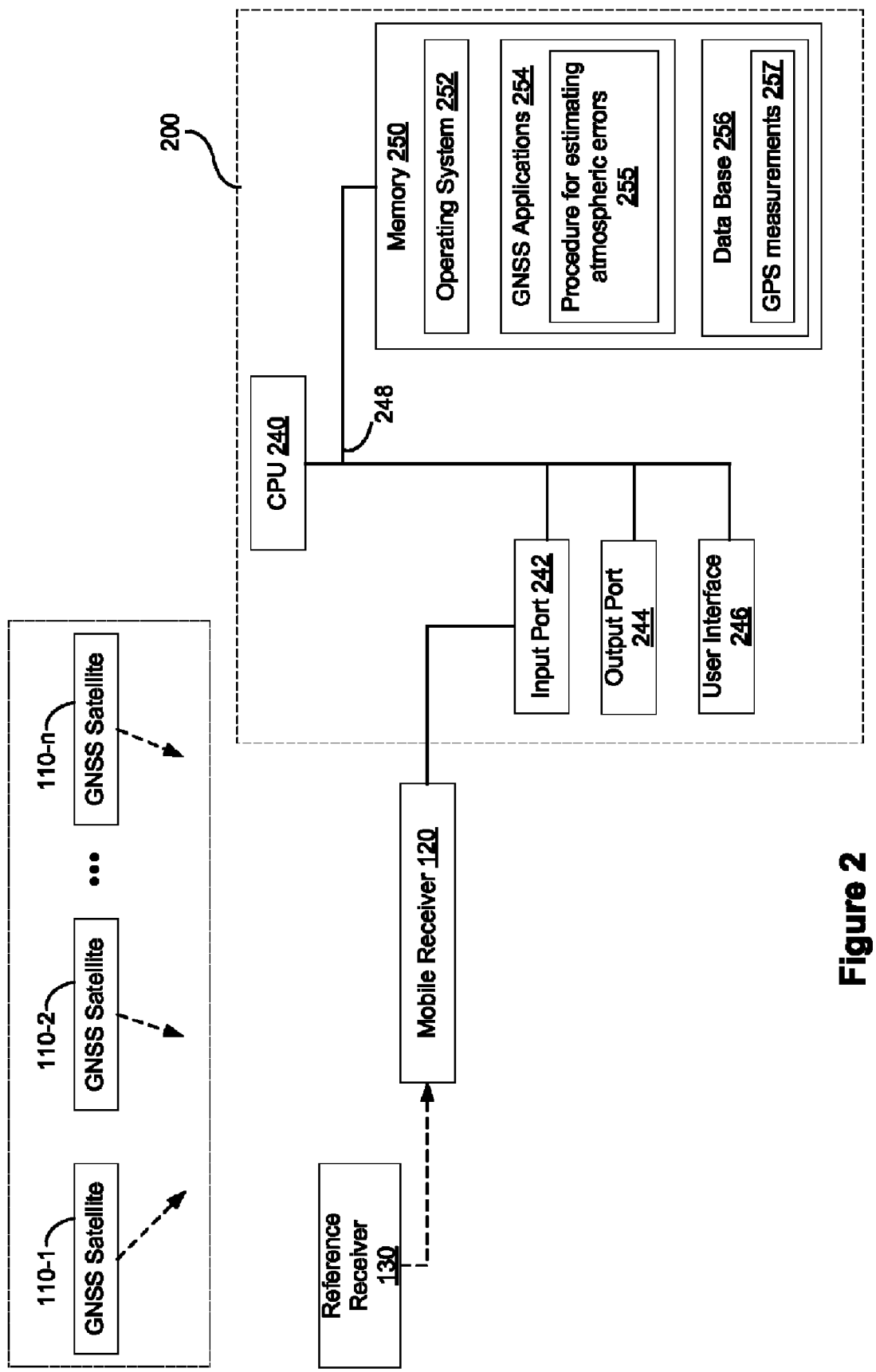
FIG. 2 is a block diagram of a computer system that can be used to carry out a method for mitigating atmospheric errors in code and carrier phase measurements.

FIG. 2 illustrates a computer system 200 that can be used to carry out a method for mitigating atmospheric errors, according to one embodiment of the present invention. The computer system 200 is coupled to a mobile receiver 120 which supplies to the computer system 200 GPS code and carrier phase measurements based on signals from the satellites.

In some embodiments, the mobile receiver 120 and the computer system 200 are integrated into a single device within a single housing, such as a portable, handheld, or even wearable position tracking device, or a vehicle-mounted or otherwise mobile positioning and/or navigation system. In other embodiments, the mobile receiver 120 and the computer system 200 are not integrated into a single device.

As shown in FIG. 2, the computer system 200 includes a central processing unit (CPU) 240, memory 250, an input port 242 and an output port 244, and (optionally) a user interface 246, coupled to each other by one or more communication buses 248. Memory 250 may include high-speed random access memory and may include nonvolatile mass storage, such as one or more magnetic disk storage devices, optical disk storage devices, flash memory devices, or other nonvolatile solid state storage devices. Memory 250 preferably stores an operating system 252, a database 256, and GNSS application procedures 254. The GNSS application procedures may include procedures 255 for implementing the method for mitigating atmospheric errors, according to some embodiments of the present invention, as described in more detail below. The operating system 252 and application programs and procedures 254 and 255 stored in memory 250 are for execution by the CPU 240 of the computer system 200. Memory 250 preferably also stores data structures used during execution of the GNSS application procedures 254 and 255, including GPS code and/or carrier phase measurements 257, as well as other data structures discussed in this document.

The input port 242 is for receiving data from the mobile receiver 120, and output port 244 is used for outputting data and/or calculation results. Data and calculation results may also be shown on a display device of the user interface 246.

Figure 3A:
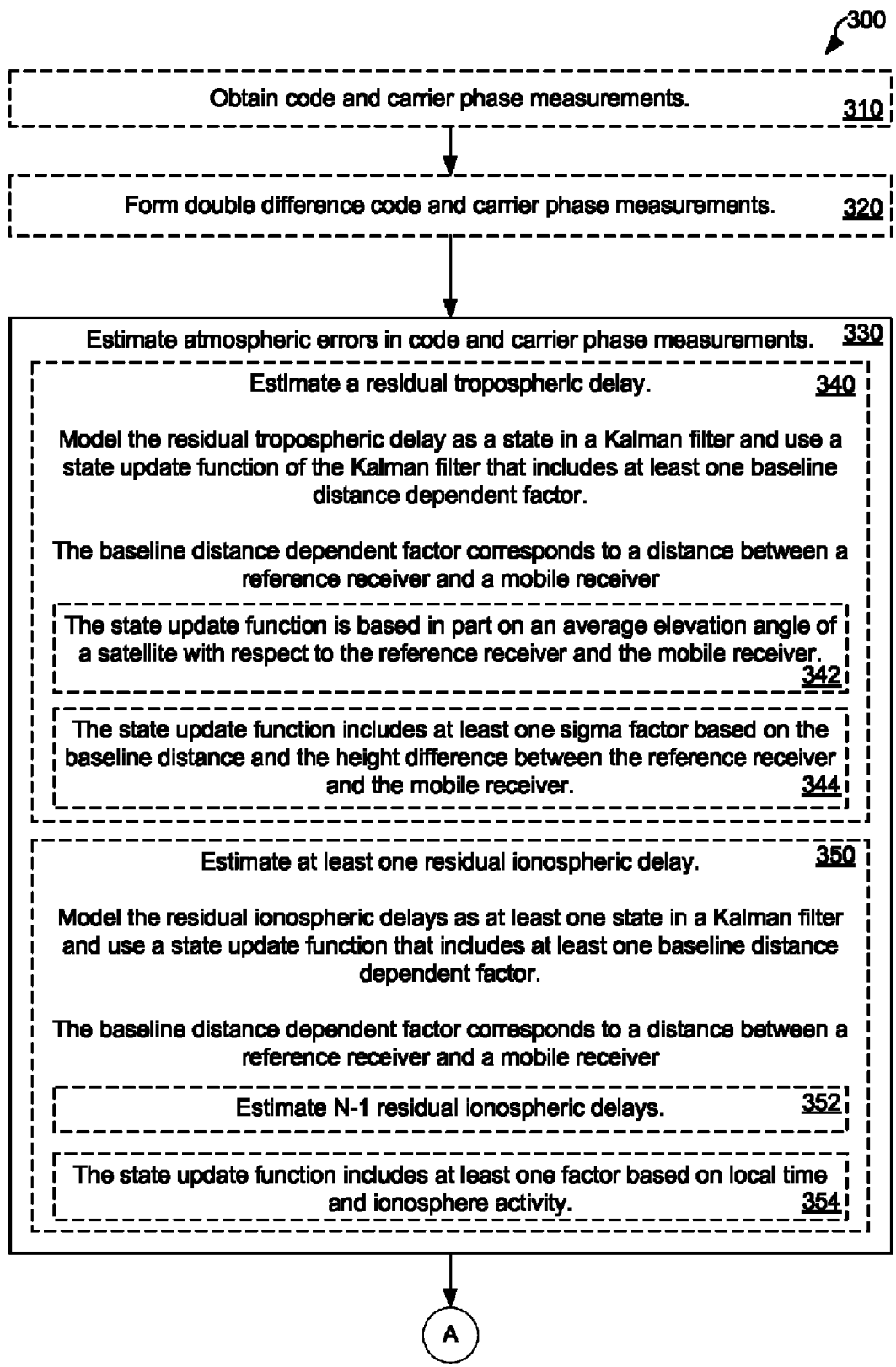
FIGS. 3A and 3B are flow diagrams illustrating a method for mitigating atmospheric errors in code and carrier phase measurements in accordance with some embodiments.
Figure 3B:
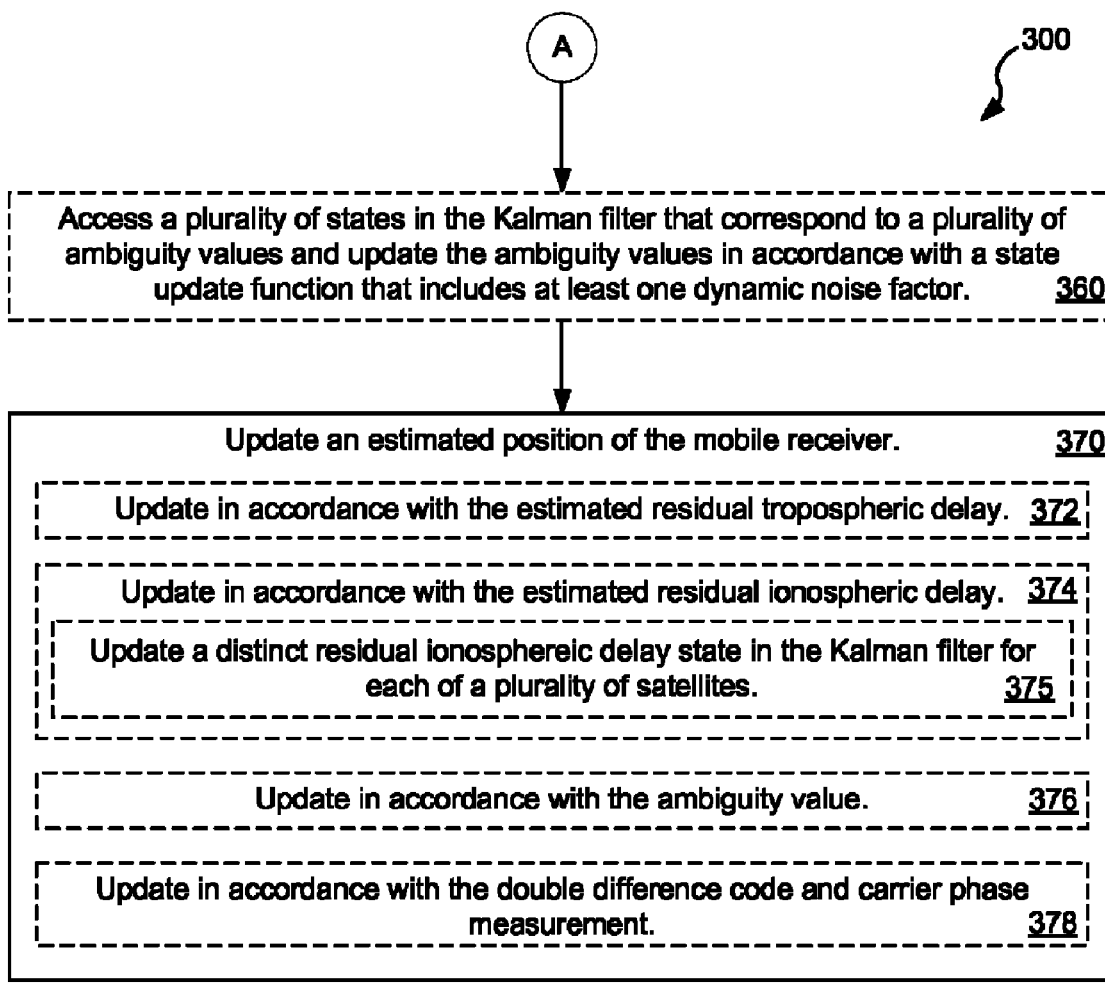

FIGS. 3A and 3B illustrate a navigation method 300 that includes operations for mitigating atmospheric errors in the code and carrier phase measurements based on signals received from the satellites. While an explanation of Kalman filters is outside the scope of this document, the computer system 200 typically includes a Kalman filter for updating the position and other aspects of the state of the user GPS receiver 120, also called the Kalman filter state. The Kalman filter state actually includes many states, each of which represents an aspect of the GPS receiver's position (e.g., X, Y and Z, or latitude, longitude and zenith components of position), or motion (e.g., velocity and/or acceleration), or the state of the computational process that is being used in the Kalman filter.

The Kalman filter is typically a procedure, or set of procedures, executed by a processor. The Kalman filter is executed repeatedly (e.g., once per second), each time using new code measurements (also called pseudorange measurements) and carrier phase measurements, to update the Kalman filter state. While the equations used by Kalman filters are complex, Kalman filters are widely used in the field of navigation, and therefore only those aspects of the Kalman filters that are relevant to the present invention need to be discussed in any detail. It should be emphasized that while Kalman filters are widely used in GPS receivers and other navigation systems, many aspects of those Kalman filters will vary from one implementation to another. For instance, the Kalman filters used in some GPS receivers may include states that are not included in other Kalman filters, or may use somewhat different equations than those used in other Kalman filters.

An aspect of Kalman filters that is relevant to the present discussion is the inclusion of values in the Kalman filter state to represent tropospheric delay and ionospheric delay of the signals received from the satellites in view, and the status of those values. In addition, the Kalman filter state may include ambiguity values for the carrier phase measurements from a plurality of the satellites.

As stated above in regard to FIG. 1, signals are received from the satellites 110 and corrections 132 are received from the reference receiver 310. Operation 310 includes obtaining code and carrier phase measurements. Double differenced code and carrier phase measurements are formed 320 to cancel many of the systematic errors existing in the GPS measurements. The double differenced code and carrier phase observables in units of meters can be formed as:

$$\nabla \Delta P_i = \nabla \Delta \rho + \nabla \Delta T + \frac{\nabla \Delta I}{f_i^2} + \nabla \Delta O + \varepsilon_{\nabla \Delta P_i} \quad (1)$$

$$\lambda_i \nabla \Delta \phi_i = \nabla \Delta \rho + \nabla \Delta T - \frac{\nabla \Delta I}{f_i^2} + \nabla \Delta O + \lambda_i \cdot \nabla \Delta N_i + \varepsilon_{\nabla \Delta \phi_i} \quad (2)$$

where: the subscript i denotes the frequency, i.e., L1, L2 or L5; $P_i$ and $\phi_i$ are the code and carrier phase observables, respectively; $\nabla \Delta$ is the double difference operator; $\rho$ is the geometric distance from the satellite to the receiver; $\nabla \Delta T$ is the residual differential tropospheric bias, which may be represented as a function of the residual zenith tropospheric delay together with a mapping function which describes the dependence on the elevation angle; $\nabla \Delta I$ is the double differential ionospheric bias; $\nabla \Delta O$ is the double differential orbital delay correction that may be obtained from a network RTK system or a wide area augmentation system (WAAS), such as Navcom Technology Inc.'s StarFire™ Network; $\lambda_i$ and $f_i$ are the wavelength and frequency of the $i^{th}$ carrier frequency, respectively; $\nabla \Delta N_i$ is the double difference integer ambiguity for the $i^{th}$ carrier frequency; and the terms $\varepsilon_{\nabla \Delta P_i}$ and $\varepsilon_{\nabla \Delta \phi_i}$ represent the code and phase errors, respectively, including random noises of receivers and any unmodeled systematic errors, such as multipath, residual orbit errors, etc.

Linearization of the double differenced carrier phase observations can be represented by the following set of equations:

$$V = HX - Z \quad (3)$$

where: V is the post-fit residual vector at epoch k; Z is the prefit residuals, which are based on the double difference measurements for the current epoch; H is the design matrix; and X is the estimated state vector including three position components, residual ionospheric and tropospheric biases, and dual or triple frequency ambiguities. The values for the estimated state vector X are stored in Kalman filter states.

In one embodiment, the Kalman filter includes a plurality of states, including but not limited to: three position states, each corresponding to a different direction or dimension; a residual tropospheric delay state; and N−1 residual ionospheric delay states. The Kalman filter state may optionally include three velocity states each corresponding to a different direction or dimension, and may optionally include three acceleration states each corresponding to a different direction or dimension. In some embodiments, the Kalman filter state includes N−1 L1 double differenced ambiguity states, and N−1 L2 double differenced ambiguity states, where N is the number of satellites from which measurements are obtained.

In one embodiment, Kalman filter projections and state updates are obtained. If the Kalman filter estimates after k−1 epochs are assumed to be $\hat{x}_{k-1}^+$ with variance $P_{k-1}^+$, the predicted state vector at the epoch k can be obtained from State Equations (4) and (5):

$$\hat{X}_k^- = \Phi_{k-1,k} \hat{X}_{k-1}^+ \quad (4)$$

$$P_k^- = \Phi_{k-1,k} P_{k-1}^+ \Phi_{k-1,k}^T + W_k \quad (5)$$

where: $\hat{X}_k^-$ is the predicted Kalman filter state vector at epoch k, predicted based on the Kalman filter state in epoch k−1; $\Phi_{k,k-1}$ is the transition matrix that relates $X_{k-1}$ to $X_k$; and $W_k$ is the dynamic matrix. $W_k$ includes the residual tropospheric delay, residual ionospheric delay values and an ambiguity value.

The updated state and variance matrix using the measurement vectors at epoch k are given by the following equations:

$$\hat{X}_k^+ = \hat{X}_k^- + KZ \quad (6)$$

$$P_k^+ = (I - KH) P_k^- \quad (7)$$

$$K = P_k^- H (H P_k^- H + R)^{-1} \quad (8)$$

where: K is the Gain matrix; R is variance covariance for observables; and I is identity matrix.

As shown in FIG. 3A, the method 300 includes estimating the atmospheric errors in the code and carrier phase measurements 330, which may include two or more of the operations described next.

The residual tropospheric delay is estimated 340. In one embodiment, this includes representing the tropospheric delay as a residual tropospheric zenith delay (RTZD) and a mapping function 342 to obtain the delay at any given satellite elevation angle 160. All the deviations of the atmospheric conditions from standard conditions are subsumed within the RTZD. After the tropospheric delay model is applied, the residual double differential tropospheric delay can be approximated by:

$$\nabla \Delta T = RTZD / [MF(\epsilon^p) - MF(\epsilon^q)] \qquad (9)$$

where: $\epsilon^p$ and $\epsilon^q$ are the average satellite elevation angles of the mobile receiver 120 and the reference receiver 130 for satellites p and q, respectively; satellite q is the highest satellite 110; and satellite p is any other satellite 110 from which the receiver is receiving measurable signals. In one embodiment, a single RTZD estimate is used for all visible satellites. The RTZD value is a component of the Kalman filter state (i.e., the tropospheric delay component), and is updated each epoch by the Kalman state update function. Therefore, no matter what the satellite elevation 160 is, the $\nabla \Delta T$ in Equations (1) and (2) will be scaled by the map function factor of the mobile receiver 120 and the reference receiver 130 location using Equation (9).

In one embodiment, estimating the residual tropospheric delay 340 includes modeling the residual tropospheric delay (e.g., the RTZD) as a state in the Kalman filter and using a state update function that includes at least one baseline distance 150 dependant factor (i.e., corresponding to a distance between a reference receiver and the mobile receiver whose location is being determined). In some embodiments, estimating the residual tropospheric delay 340 includes using a state update function with at least one factor based on the baseline distance 150 and height difference 155 between the reference and mobile receivers 344. In some of these embodiments, the transition matrix $\phi_{k,k-1}$ and dynamic model $Q_k$ are given by:

$$\phi_{k,k-1} = e^{-\beta_{trop}(t_k - t_{k-1})} \qquad (10)$$

$$Q_k = \frac{\sigma_{trop}^2}{2\beta_{trop}}(1 - e^{-2\beta_{trop}(t_k - t_{k-1})}) \qquad (11)$$

$$\sigma_{trop}^2 = \sigma_{hor}^2 \times l^2 + \sigma_v^2 \times \Delta H^2 \qquad (12)$$

where: $1/\beta_{trop}$ is the correlation time of the troposphere wet component, which is typically between 600 and 1800 seconds; $\sigma_{trop}^2$ is the troposphere wet variance component and is a function of the baseline distance l and height difference $\Delta H$; $\sigma_{hor}^2$ is the variance for horizontal wet component, typically between 0.1 ppm and 0.5 ppm of the baseline distance l; and $\sigma_v^2$ is the variance for the vertical wet component, typically between 1 ppm and 10 ppm of the baseline distance l. $Q_k$ and $\Phi_{k,k-1}$ are the residual tropospheric delay portions of $W_k$ in Equation (5) and $\Phi_{k,k-1}$ in Equation (4), respectively. In some embodiments, $\sigma_{hor}^2$ is set to a fixed value, such as 0.1 ppm, and $1/\beta_{trop}$ is set to a fixed value, such as 600 seconds. In some other embodiments, the values of $\sigma_{hor}^2$ and $1/\beta_{trop}$ are computed based on information available to the mobile receiver, such as the baseline distance between the mobile receiver and the reference receiver. In some embodiments, the values of $\sigma_{hor}^2$ and $1/\beta_{trop}$ are obtained from a look-up-table, using the baseline distance between the mobile receiver and the reference receiver (or a value related to the baseline distance) as an index into the look-up table.

At least one residual ionospheric delay is estimated 350. In one embodiment, after the code and carrier phase measurements are adjusted by the broadcast ionospheric model and differenced with the corrections 132 from the reference receiver 130, the remaining ionospheric delay is estimated in a Kalman filter as an element of the state vector. In one embodiment, estimating the residual ionospheric delay 350 includes modeling the residual ionospheric delay as a state in the Kalman filter and using a state update function that includes at least one baseline distance 150 dependant factor. In another embodiment, a state update function with at least one factor based on the local time and ionosphere activity is used 354. In this embodiment, the transition matrix $\phi_{k-1,k}$ and dynamic model $Q_k$ of the state update function are given by:

$$\phi_{k-1,k} = e^{-\beta_{ion}(t_k - t_{k-1})} \qquad (13)$$

$$Q_k = \frac{\sigma_{sion}^2}{2\beta_{ion}}(1 - e^{-2\beta_{ion}(t_k - t_{k-1})}) \qquad (14)$$

$$\sigma_{sion} = \frac{\sigma_{vion} \times l}{\sqrt{1 - \left(\frac{R}{R+H}\cos(E)\right)^2}} \qquad (15)$$

where: $1/\beta_{ion}$ is the correlation time of the differential ionosphere bias, typically between 30 and 300 seconds; $\sigma_{sion}$ and $\sigma_{vion}$ represent the variance of the differential slant and vertical ionosphere biases, and $\sigma_{vion}$ is a function of the local time and ionosphere activity; l is the baseline distance 150; E is satellite elevation 160; H is the height of the ionospheric layer 185, which may be assumed to be 350 km, for example; and R is 6371 km, the mean radius of the earth. $\sigma_{vion}$ typically varies between 0.5 ppm and 2 ppm of the baseline distance 150. $Q_k$ and $\phi_{k,k-1}$ are the residual ionospheric delay portions of $W_k$ in Equation (5) and $\Phi_{k,k-1}$ in Equation (4), respectively. In some embodiments, $\sigma_{vion}$ is set to a fixed value, such as 1 ppm, and $1/\beta_{ion}$ is set to a fixed value, such as 30 seconds. In some embodiments, the values of $\sigma_{vion}$ and $1/\beta_{ion}$ are computed based on information available to the mobile receiver, such as the local time computed from the preliminary GPS solution using the GMT or GPS time and the computed longitude of the receiver. In some embodiments, the values of $\sigma_{hor}^2$ and $1/\beta_{trop}$ are obtained from a look-up-table.

Unlike residual tropospheric bias, the residual ionosphere delay is estimated for every satellite other than the reference satellite 352. Therefore, there will be N−1 residual ionospheric bias estimations and N−1 Kalman filter state values representing the N−1 residual ionospheric bias estimations.

In some embodiments, the method further includes accessing a plurality of states in the Kalman filter, corresponding to a plurality of ambiguity values 360. These states are then updated in accordance with a state update function that includes at least one dynamic noise factor. The transition matrix $\phi_{k-1, k}$ and dynamic model $Q_k$ of the state update function are given by $$\Phi_{k-1,k} = 1 \qquad (16)$$

$$Q_k = \delta_{amb}^2 (t_k - t_{k-1}) \qquad (17)$$

where: $\delta_{amb}$ is a small dynamic noise value such as 0.001 cycle. $Q_k$ and $\phi_{k,k-1}$ are the ambiguity value portions of $W_k$ in Equation (5) and $\Phi_{k,k-1}$ in Equation (4), respectively.

In some embodiments, the navigation method 300 includes updating an estimated position of the mobile receiver 120 (370). Typically, the estimated position is updated in accordance with the double differenced code and carrier phase measurements 378, as well as other information available to the mobile receiver (or to the computer system that is determining the location of the mobile receiver). In some embodiments, the estimated position is updated in accordance with the estimated residual tropospheric delay 372. In some embodiments, the estimated position is updated in accordance with the estimated residual ionospheric delay 374. In some of these embodiments, a distinct residual ionospheric delay state in the Kalman filter is updated 375 for each of a plurality of satellites 110 (e.g., for all of the satellites in view other than the one most directly overhead). In some embodiments, the estimated position is updated in accordance with the ambiguity state values in the Kalman filter state 376.

Figure 4:
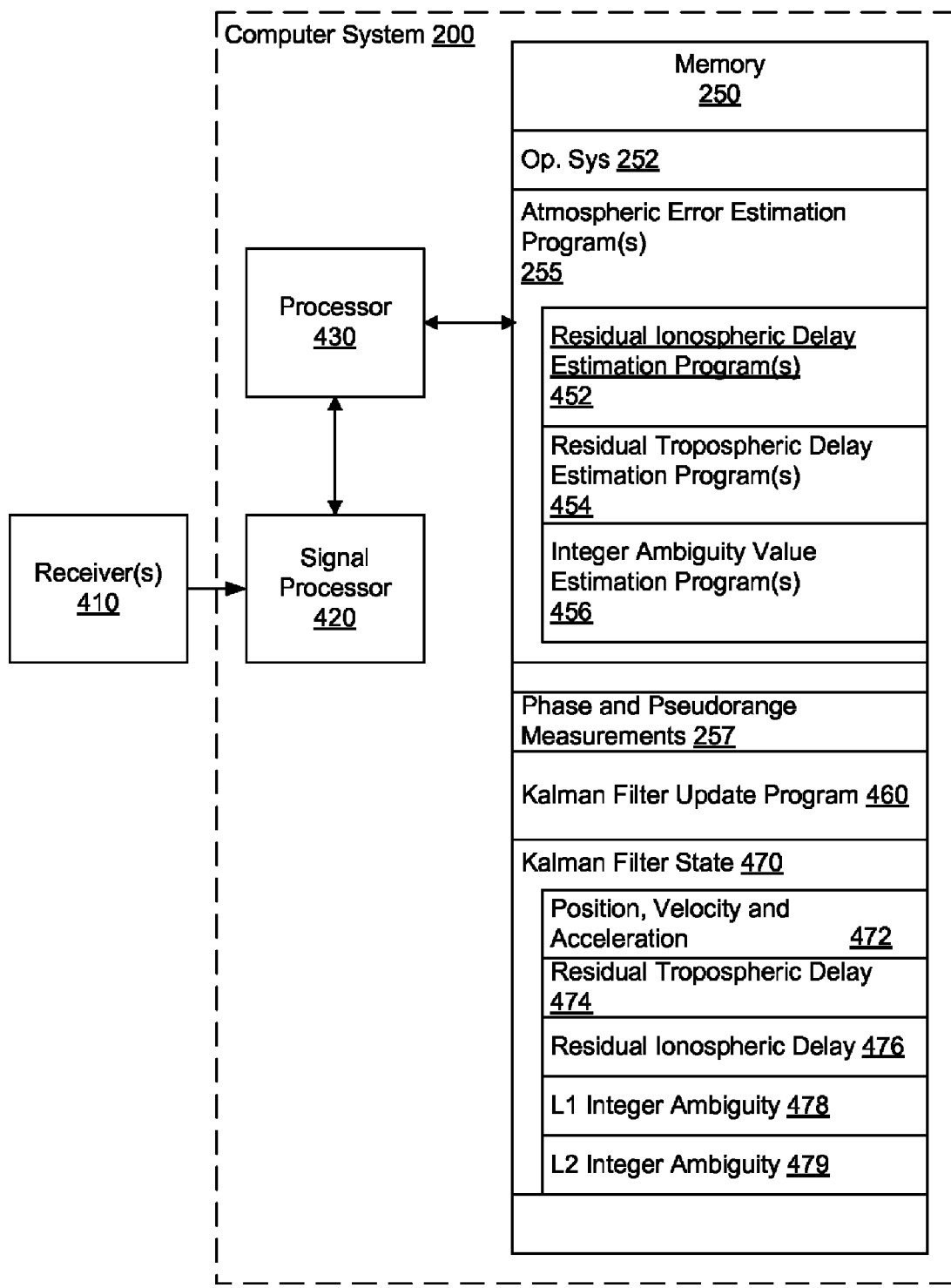
FIG. 4 is a block diagram illustrating components in a global navigation satellite system in accordance with some embodiments.

FIG. 4 illustrates an embodiment of the computer system 200. The computer system 200 includes a signal processor 420, at least one processor 430 and a memory 250. Memory 250, which may include high-speed random access memory and may also include non-volatile memory, such as one or more magnetic disk storage devices, EEPROM and/or Flash EEPROM, includes an operating system 252, code and carrier phase measurements 257, a Kalman filter update program 460, a Kalman filter state 470, and at least one atmospheric error estimation program module 255, executed by processor 430. Stored in the Kalman filter state 470 is a plurality of state values: a position 472, a residual tropospheric delay value 474, a plurality (e.g., N−1) of residual ionospheric delay values 476, a plurality (e.g., N−1) L1 integer ambiguity values 478, and a plurality (e.g., N−1) L2 integer ambiguity values 479, each of which has been discussed above. The at least one atmospheric error estimation program module 255 includes at least one residual ionospheric delay estimation program 552, at least one residual tropospheric delay estimation program 554, and at least one integer ambiguity value estimation program 556.

In some embodiments there may be more than one processor 430. In other embodiments, the computer system 200 may include an application specific integrated circuit (ASIC) that performs some or all of the functionality of the atmospheric error estimation program module 255.

In some embodiments, the computer system 200 is coupled to a receiver 410, such as the mobile receiver 120 (FIG. 1). In other embodiments, the computer system 200 and the receiver 410 are integrated into a single device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method for mitigating atmospheric errors in code and carrier phase measurements based on signals received from a plurality of satellites in a global navigation satellite system, the method comprising:
   estimating a residual tropospheric delay, the residual tropospheric delay modeled as a state in a Kalman filter, and wherein a state update function of the Kalman filter for the residual tropospheric delay includes at least one baseline distance dependent factor, wherein the at least one baseline distance dependent factor corresponds to a baseline distance between a reference receiver and a mobile receiver; and
   updating an estimated position of the mobile receiver in accordance with the estimated residual tropospheric delay and the code and carrier phase measurements, wherein the estimated position of the mobile receiver is modeled as coordinate states in the Kalman filter;
   wherein the state update function of the Kalman Filter includes a dynamic model $Q_k$ for the residual tropospheric delay given by:

$$Q_k = \frac{\sigma_{trop}^2}{2\beta_{trop}}(1 - e^{-2\beta_{trop}(t_k - t_{k-1})}) \text{ and}$$

$$\sigma_{trop}^2 = \sigma_{hor}^2 \times l^2 + \sigma_v^2 \times \Delta H^2$$

where $1/\beta_{trop}$ comprises a correlation time of a troposphere wet component of the residual tropospheric delay, $\sigma_{trop}^2$ comprises a troposphere wet variance component of the residual tropospheric delay and is a function of the baseline distance l and height difference $\Delta H$ between the reference receiver and mobile receiver, $\sigma_{hor}^2$ comprises a variance for a horizontal wet component of the residual tropospheric delay, and $\sigma_v^2$ comprises a variance for a vertical wet component of the residual tropospheric delay.

2. The method of claim 1, including:
   obtaining code and carrier phase measurements based on signals received from the plurality of satellites at the reference receiver and mobile receiver;
   computing double difference values from the obtained measurements to form double difference code and carrier phase measurements; and
   updating the estimated position of the mobile receiver in accordance with the estimated residual tropospheric delay and the double difference code and carrier phase measurements.

3. The method of claim 1, wherein the Kalman filter includes a plurality of states, including a single state that scales the residual tropospheric delay.

4. The method of claim 1, wherein the state update function of the Kalman filter for the residual tropospheric delay is based in part on an average elevation angle of a satellite with respect to the reference receiver and the mobile receiver.

5. The method of claim 1, wherein the state update function of the Kalman filter for the residual tropospheric delay includes at least one factor based on the baseline distance and a height difference between the reference receiver and the mobile receiver.

6. The method of claim 1, further comprising:
   estimating at least one residual ionospheric delay, the at least one residual ionospheric delay modeled as at least one state in the Kalman filter, and wherein a state update function of the Kalman filter for the at least one residual ionospheric delay includes at least one baseline distance dependent factor; and
   updating the estimated position of the mobile receiver in accordance with the at least one estimated residual ionospheric delays and the code and carrier phase measurements.

7. The method of claim 6, including:
   obtaining code and carrier phase measurements based on signals received from the plurality of satellites at the reference receiver and mobile receiver;
   computing double difference values from the obtained measurements to form double difference code and carrier phase measurements; and
   updating the estimated position of the mobile receiver in accordance with the estimated residual tropospheric delay, the at least one estimated residual ionospheric delays, and the double difference code and carrier phase measurements.

8. The method of claim 6, wherein the updating includes updating a distinct residual ionospheric delay state in the Kalman filter for each of a plurality of satellites.

9. The method of claim 6, wherein the state update function of the Kalman filter for the at least one residual ionospheric delay includes at least one factor based on local time and ionosphere activity.

10. The method of claim 1, further comprising:
estimating N−1 residual ionospheric delays, the N−1 residual ionospheric delays modeled as N−1 states in the Kalman filter, and wherein a state update function of the Kalman filter for the N−1 residual ionospheric delays includes at least one baseline distance dependent factor for each of the N−1 states, wherein N comprises a number of satellites from which signals are received and for which code and carrier phase measurements are made; and
updating the estimated position of the mobile receiver in accordance with the N−1 estimated residual ionospheric delays and the code and carrier phase measurements.

11. The method of claim 10, including:
obtaining code and carrier phase measurements based on signals received from the plurality of satellites at the reference receiver and mobile receiver;
computing double difference values from the obtained measurements to form double difference code and carrier phase measurements; and
updating the estimated position of the mobile receiver in accordance with the estimated residual tropospheric delay, the estimated N−1 residual ionospheric delays, and the double difference code and carrier phase measurements.

12. The method of claim 10, wherein the updating includes updating a distinct residual ionospheric delay state in the Kalman filter for each of a plurality of satellites.

13. The method of claim 10, wherein the state update function of the Kalman filter for the N−1 residual ionospheric delays includes at least one factor based on local time and ionosphere activity.

14. A method for mitigating atmospheric errors in code and carrier phase measurements based on signals received from a plurality of satellites in a global navigation satellite system, the method comprising:
estimating at least one residual ionospheric delay, the at least one residual ionospheric delay modeled as at least one state in the Kalman filter, and wherein a state update function of the Kalman filter for the at least one residual ionospheric delay includes at least one baseline distance dependent factor, wherein the at least one baseline distance dependent factor corresponds to a distance between a reference receiver and a mobile receiver; and
updating an estimated position of the mobile receiver in accordance with the at least one estimated residual ionospheric delays and the code and carrier phase measurements, wherein the estimated position of the mobile receiver is modeled as a state in the Kalman filter;
wherein the state update function of the Kalman Filter for the at least one residual ionospheric delay includes a dynamic model $Q_k$ for the residual ionospheric delay given by:

$$Q_k = \frac{\sigma_{sion}^2}{2\beta_{ion}}(1 - e^{-2\beta_{ion}(t_k - t_{k-1})}) \text{ and}$$

$$\sigma_{sion} = \frac{\sigma_{vion} \times l}{\sqrt{1 - \left(\frac{R}{R+H}\cos(E)\right)^2}}$$

where $1/\beta_{ion}$ comprises a correlation time of the differential ionosphere bias, $\sigma_{sion}$ and $\sigma_{vion}$ comprise a variance of differential slant and vertical ionosphere biases, $\sigma_{vion}$ is a function of local time and ionosphere activity, l is the baseline distance, E is satellite elevation, H comprises a height of earth's ionospheric layer, and R comprises a mean radius of the earth.

15. The method of claim 14, including:
obtaining code and carrier phase measurements based on signals received from the plurality of satellites at the reference receiver and mobile receiver;
computing double difference values from the obtained measurements to form double difference code and carrier phase measurements; and
updating the estimated position of the mobile receiver in accordance with the at least one estimated residual ionospheric delays and the double difference code and carrier phase measurements.

16. The method of claim 14, wherein the updating includes updating a distinct residual ionospheric delay state in the Kalman filter for each of a plurality of satellites.

17. A method for mitigating atmospheric errors in code and carrier phase measurements based on signals received from a plurality of satellites in a global navigation satellite system, the method comprising:
estimating N−1 residual ionospheric delays, the N−1 residual ionospheric delays modeled as N−1 states in the Kalman filter, and wherein a state update function of the Kalman filter for the N−1 residual ionospheric delays includes at least one baseline distance dependent factor for each of the N−1 states, wherein N comprises a number of satellites from which signals are received and for which code and carrier phase measurements are made, and wherein the at least one baseline distance dependent factor corresponds to a distance between a reference receiver and a mobile receiver; and
updating an estimated position of the mobile receiver in accordance with the N−1 estimated residual ionospheric delays and the code and carrier phase measurements, wherein the estimated position of the mobile receiver is modeled as a state in the Kalman filter;
wherein the state update function of the Kalman Filter for the N−1 residual ionospheric delays includes a dynamic model for the residual delays given by:

$$Q_k = \frac{\sigma_{sion}^2}{2\beta_{ion}}(1 - e^{-2\beta_{ion}(t_k - t_{k-1})}) \text{ and}$$

$$\sigma_{sion} = \frac{\sigma_{vion} \times l}{\sqrt{1 - \left(\frac{R}{R+H}\cos(E)\right)^2}}$$

where $1/\beta_{ion}$ comprises a correlation time of the differential ionosphere bias, $\sigma_{sion}$ and $\sigma_{vion}$ comprise a variance of differential slant and vertical ionosphere biases, $\sigma_{vion}$ is a function of local time and ionosphere activity, l is the baseline distance, E is satellite elevation, H comprises a height of earth's ionospheric layer, and R comprises a mean radius of the earth.

18. The method of claim 17, including:
obtaining code and carrier phase measurements based on signals received from the plurality of satellites at the reference receiver and mobile receiver;
computing double difference values from the obtained measurements to form double difference code and carrier phase measurements; and
updating the estimated position of the mobile receiver in accordance with the estimated N−1 residual ionospheric delays and the double difference code and carrier phase measurements.

19. The method of claim 17, wherein the updating includes updating a distinct residual ionospheric delay state in the Kalman filter for each of a plurality of satellites.

20. A positioning or navigation system, comprising:
a mobile receiver configured to receive satellite signals from a plurality of satellites in a global navigation system;
a computer system coupled to the receiver, the computer system including one or more processors and a memory coupled to the one or more processors, the memory storing one or more programs for configured for execution by the one or more processors, the one or more programs for mitigating atmospheric errors in code and carrier phase measurements based on the signals received from the satellites, the one or more programs including:
instructions for estimating a residual tropospheric delay, the residual tropospheric delay modeled as a state in a Kalman filter, and wherein a state update function of the Kalman filter includes at least one baseline distance dependent factor, wherein the at least one baseline distance dependent factor corresponds to a distance between a reference receiver and the mobile receiver; and
instructions for updating an estimated position of the mobile receiver in accordance with the estimated residual tropospheric delay and the code and carrier phase measurements, wherein the estimated position of the mobile receiver is modeled as a state in the Kalman filter;
wherein the state update function of the Kalman Filter includes a dynamic model $Q_k$ for the residual tropospheric delay given by:

$$Q_k = \frac{\sigma_{trop}^2}{2\beta_{trop}}(1 - e^{-2\beta_{trop}(t_k - t_{k-1})}) \text{ and}$$

$$\sigma_{trop}^2 = \sigma_{hor}^2 \times l^2 + \sigma_v^2 \times \Delta H^2$$

where $1/\beta_{trop}$ comprises a correlation time of a troposphere wet component of the residual tropospheric delay, $\sigma_{trop}^2$ comprises a troposphere wet variance component of the residual tropospheric delay and is a function of the baseline distance l and height difference $\Delta H$ between the reference receiver and mobile receiver, $\sigma_{hor}^2$ comprises a variance for a horizontal wet component of the residual tropospheric delay, and $\sigma_v^2$ comprises a variance for a vertical wet component of the residual tropospheric delay.

21. The system of claim 20, wherein the one or more programs include:
instructions for obtaining code and carrier phase measurements based on signals received from the-plurality of satellites at the reference receiver and mobile receiver;
instructions for computing double difference values from the obtained measurements to form double difference code and carrier phase measurements; and
instructions for updating the estimated position of the mobile receiver in accordance with the estimated residual tropospheric delay and the double difference code and carrier phase measurements.

22. The system of claim 20, wherein the Kalman filter operates in a plurality of states, including a single state comprising the residual tropospheric delay.

23. The system of claim 20, wherein the state update function of the Kalman filter is based in part on an average elevation angle of a satellite with respect to the reference receiver and the mobile receiver.

24. The system of claim 20, wherein the state update function of the Kalman filter includes at least one factor based on the baseline distance and a height difference between the reference receiver and the mobile receiver.

25. A positioning or navigation system, comprising:
a mobile receiver configured to receive satellite signals from a plurality of satellites in a global navigation system;
a computer system coupled to the receiver, the computer system including one or more processors and a memory coupled to the one or more processors, the memory storing one or more programs configured for execution by the one or more processors, the one or more programs for mitigating atmospheric errors in code and carrier phase measurements based on the signals received from the satellites, the one or more programs including:
instructions for estimating N−1 residual ionospheric delays, the N−1 residual ionospheric delays modeled as a state in a Kalman filter, and wherein a state update function of the Kalman filter includes at least one baseline distance dependent factor, wherein the at least one baseline distance dependent factor corresponds to a distance between a reference receiver and the mobile receiver; and
instructions for updating an estimated position of the mobile receiver in accordance with the estimated N−1 residual ionospheric delays and the code and carrier phase measurements, wherein the estimated position of the mobile receiver is modeled as a state in the Kalman filter;
wherein the state update function of the Kalman Filter for the N−1 residual ionospheric delays includes a dynamic model for the residual ionospheric delays given by:

$$Q_k = \frac{\sigma_{sion}^2}{2\beta_{ion}}(1 - e^{-2\beta_{ion}(t_k - t_{k-1})}) \text{ and}$$

$$\sigma_{sion} = \frac{\sigma_{vion} \times l}{\sqrt{1 - \left(\frac{R}{R+H}\cos(E)\right)^2}}$$

where $1/\beta_{ion}$ comprises a correlation time of the differential ionosphere bias, $\sigma_{sion}$ and $\sigma_{vion}$ is a comprise a variance of differential slant and vertical ionosphere biases, $\sigma_{vion}$ is a function of local time and ionosphere activity, l is the baseline distance, E is satellite elevation, H comprises a height of earth's ionospheric layer, and R comprises a mean radius of the earth.

26. The system of claim 25, wherein the one or more programs include:

instructions for obtaining code and carrier phase measurements based on signals received from the plurality of satellites at the reference receiver and mobile receiver;

instructions for computing double difference values from the obtained measurements to form double difference code and carrier phase measurements; and instructions for updating the estimated position of the mobile receiver in accordance with the estimated N−1 residual ionospheric delays and the double difference code and carrier phase measurements.

27. The system of claim 25, wherein the updating includes updating a distinct residual ionospheric delay state in the Kalman filter for each of a plurality of satellites.

28. The system of claim 25, wherein the state update function of the Kalman filter for the N−1 residual ionospheric delays includes at least one factor based on local time and ionosphere activity.

29. A positioning or navigation device, comprising:
a mobile receiver configured to receive satellite signals from a plurality of satellites in a global navigation system;

memory;

one or more processors;

one or more programs stored in the memory for execution by the one or more processors, the one or more programs for mitigating atmospheric errors in code and carrier phase measurements based on the signals received from the satellites, the one or more programs including:

instructions for estimating a residual tropospheric delay, the residual tropospheric delay modeled as a state in a Kalman filter, and wherein a state update function of the Kalman filter includes at least one baseline distance dependent factor, wherein the at least one baseline distance dependent factor corresponds to a distance between a reference receiver and the mobile receiver; and instructions for updating an estimated position of the mobile receiver in accordance with the estimated residual tropospheric delay and the code and carrier phase measurements, wherein the estimated position of the mobile receiver is modeled as a state in the Kalman filter;

wherein the state update function of the Kalman Filter includes a dynamic model $Q_k$ for the residual tropospheric delay given by:

$$Q_k = \frac{\sigma_{trop}^2}{2\beta_{trop}}(1 - e^{-2\beta_{trop}(t_k - t_{k-1})}) \text{ and}$$

$$\sigma_{trop}^2 = \sigma_{hor}^2 \times l^2 + \sigma_v^2 \times \Delta H^2$$

where $1/\beta_{trop}$ comprises a correlation time of a troposphere wet component of the residual tropospheric delay, $\sigma_{trop}^2$ comprises a troposphere wet variance component of the residual tropospheric delay and is a function of the baseline distance l and height difference $\Delta H$ between the reference receiver and mobile receiver, $\sigma_{hor}^2$ comprises a variance for a horizontal wet component of the residual tropospheric delay, and $\sigma_v^2$ comprises a variance for a vertical wet component of the residual tropospheric delay.

30. The device of claim 29, wherein the one or more programs include:

instruction for obtaining code and carrier phase measurements based on signals received from the plurality of satellites at the reference receiver and mobile receiver;

instruction for computing double difference values from the obtained measurements to form double difference code and carrier phase measurements; and instruction for updating the estimated position of the mobile receiver in accordance with the estimated residual tropospheric delay and the double difference code and carrier phase measurements.

31. The device of claim 29, wherein the Kalman filter operates in a plurality of states, including a single state comprising the residual tropospheric delay.

32. The device of claim 29, wherein the state update function of the Kalman filter is based in part on an average elevation angle of a satellite with respect to the reference receiver and the mobile receiver.

33. The device of claim 29, wherein the state update function of the Kalman filter includes at least one factor based on the baseline distance and a height difference between the reference receiver and the mobile receiver.

34. A positioning or navigation device, comprising:
a mobile receiver configured to receive satellite signals from a plurality of satellites in a global navigation system;

memory;

one or more processors;

one or more programs stored in the memory for execution by the one or more processors, the one or more programs for mitigating atmospheric errors in code and carrier phase measurements based on the signals received from the satellites, the one or more programs including:

instructions for estimating N−1 residual ionospheric delays, the N−1 residual ionospheric delays modeled as a state in a Kalman filter, and wherein a state update function of the Kalman filter includes at least one baseline distance dependent factor, wherein the at least one baseline distance dependent factor corresponds to a distance between a reference receiver and the mobile receiver; and instructions for updating an estimated position of the mobile receiver in accordance with the estimated N−1 residual ionospheric delays and the code and carrier phase measurements, wherein the estimated position of the mobile receiver is modeled as a state in the Kalman filter;

wherein the state update function of the Kalman filter for the N−1 residual ionospheric delays includes the least one baseline distance dependent factor and a satellite elevation dependent factor; and wherein the state update function of the Kalman Filter for the N−1 residual ionospheric delays includes a dynamic model for the residual ionospheric delays given by:

$$Q_k = \frac{\sigma_{sion}^2}{2\beta_{ion}}(1 - e^{-2\beta_{ion}(t_k - t_{k-1})}) \text{ and}$$

$$\sigma_{sion} = \frac{\sigma_{vion} \times l}{\sqrt{1 - \left(\frac{R}{R+H}\cos(E)\right)^2}}$$

where $1/\beta_{ion}$ comprises a correlation time of the differential ionosphere bias, $\sigma_{sion}$ and $\sigma_{vion}$ comprise a variance of differential slant and vertical ionosphere biases, $\sigma_{vion}$ is a function of local time and ionosphere activity, l is the baseline distance, E is satellite elevation; H comprises a height of earth's ionospheric layer, and R comprises a mean radius of the earth.

35. The device of claim 34, wherein the one or more programs include:
  instruction for obtaining code and carrier phase measurements based on signals received from the-plurality of satellites at the reference receiver and mobile receiver;
  instruction for computing double difference values from the obtained measurements to form double difference code and carrier phase measurements; and
  instruction for updating the estimated position of the mobile receiver in accordance with the estimated N−1 residual ionospheric delays and the double difference code and carrier phase measurements.

36. The device of claim 34, wherein the updating includes updating a distinct residual ionospheric delay state in the Kalman filter for each of a plurality of satellites.

37. The device of claim 34, wherein the state update function of the Kalman filter for the N−1 residual ionospheric delays includes at least one factor based on local time and ionosphere activity.

38. The method of claim 6, wherein the state update function of the Kalman filter for the at least one residual ionospheric delay includes the least one baseline distance dependent factor and a satellite elevation dependent factor.

39. The method of claim 28, wherein the state update function of the Kalman Filter for the at least one residual ionospheric delay includes a dynamic model $Q_k$ for the residual ionospheric delay given by:

$$Q_k = \frac{\sigma_{sion}^2}{2\beta_{ion}}(1 - e^{-2\beta_{ion}(t_k - t_{k-1})}) \text{ and}$$

$$\sigma_{sion} = \frac{\sigma_{vion} \times l}{\sqrt{1 - \left(\frac{R}{R+H}\cos(E)\right)^2}}$$

where $1/\beta_{ion}$ comprises a correlation time of the differential ionosphere bias, $\sigma_{sion}$ and $\sigma_{vion}$ is a comprise a variance of differential slant and vertical ionosphere biases, $\sigma_{vion}$ is a function of local time and ionosphere activity, l is the baseline distance, E is satellite elevation; H comprises a height of earth's ionospheric layer, and R comprises a mean radius of the earth.

* * * * *

UNITED STATES PATENT AND TRADEMARK OFFICE
CERTIFICATE OF CORRECTION

| | | |
|---|---|---|
| PATENT NO. | : 8,035,552 B2 | Page 1 of 1 |
| APPLICATION NO. | : 12/119451 | |
| DATED | : October 11, 2011 | |
| INVENTOR(S) | : Dai et al. | |

It is certified that error appears in the above-identified patent and that said Letters Patent is hereby corrected as shown below:

On the Title Page at Paragraph (54), please delete "DEPENDANT." and insert --DEPENDENT--

On the Title Page at Paragraph 57 in the ABSTRACT, line 7, please delete "dependant" and insert --dependent--

In the Specification, Column 2, line 47, please delete "dependant" and insert --dependent--

In the Specification, Column 7, line 23, please delete "dependant" and insert --dependent--

In the Specification, Column 8, line 3, please delete "dependant" and insert --dependent--

In the Claims, Column 14, line 43, please delete "is a"

Signed and Sealed this
Twenty-seventh Day of December, 2011

David J. Kappos
*Director of the United States Patent and Trademark Office*